(12) United States Patent
Zeng et al.

(10) Patent No.: US 10,444,342 B2
(45) Date of Patent: Oct. 15, 2019

(54) CONTROL OF HOST DEVICE USING THREE-DIMENSIONAL POSITION AND VELOCITY

(71) Applicant: GM GLOBAL TECHNOLOGY OPERATIONS LLC, Detroit, MI (US)

(72) Inventors: Shuqing Zeng, Sterling Heights, MI (US); Jay H. Sim, Bloomfield, MI (US); Mohammad Naserian, Windsor (CA)

(73) Assignee: GM Global Technology Operations LLC., Detroit, MI (US)

( * ) Notice: Subject to any disclaimer, the term of this patent is extended or adjusted under 35 U.S.C. 154(b) by 310 days.

(21) Appl. No.: 15/452,851

(22) Filed: Mar. 8, 2017

(65) Prior Publication Data
US 2018/0259637 A1 Sep. 13, 2018

(51) Int. Cl.
| | |
|---|---|
| *G01S 13/86* | (2006.01) |
| *G01S 13/93* | (2006.01) |
| *G05D 1/02* | (2006.01) |
| *B60W 10/18* | (2012.01) |
| *B60W 30/09* | (2012.01) |
| *G06K 9/00* | (2006.01) |

(52) U.S. Cl.
CPC .......... *G01S 13/867* (2013.01); *B60W 10/18* (2013.01); *B60W 30/09* (2013.01); *G01S 13/931* (2013.01); *G05D 1/0223* (2013.01); *G05D 1/0246* (2013.01); *G05D 1/0257* (2013.01); *G06K 9/00805* (2013.01); *B60W 2300/10* (2013.01); *B60W 2300/123* (2013.01); *B60W 2300/125* (2013.01); *B60W 2300/15* (2013.01); *B60W 2300/34* (2013.01); *B60W 2420/52* (2013.01); *B60W 2510/18* (2013.01); *B60W 2550/10* (2013.01); *B60W 2710/18* (2013.01); *B60W 2750/30* (2013.01); *B60Y 2200/30* (2013.01); *B60Y 2200/51* (2013.01); *G01S 2013/9346* (2013.01)

(58) Field of Classification Search
CPC ..................................... G01S 13/867
USPC ..................................... 342/70–72
See application file for complete search history.

(56) References Cited

U.S. PATENT DOCUMENTS

| | | | | |
|---|---|---|---|---|
| 9,429,650 | B2* | 8/2016 | Zeng | G01S 13/867 |
| 9,708,004 | B2* | 7/2017 | Weisswange | G06K 9/00791 |
| 2003/0210807 | A1* | 11/2003 | Sato | G06K 9/00805 |
| | | | | 382/104 |
| 2010/0191391 | A1* | 7/2010 | Zeng | G01S 13/723 |
| | | | | 701/1 |

(Continued)

*Primary Examiner* — Marcus E Windrich
(74) *Attorney, Agent, or Firm* — Quinn IP Law

(57) ABSTRACT

A system and method of controlling operation of a host device in real-time, the host device operatively connected to an optical device and a radar device. The optical device is configured to obtain visual data of at least one object. The object is located at an incline, relative to the host device, the incline being characterized by an elevation angle (ϕ) and an azimuth angle (θ). The radar device is configured to obtain radar data, including a radial distance (r) of the object from the host device, the azimuth angle (θ), and a range rate (dr/dt). The controller is programmed to determine a time-to-contact for the host device and the object based at least partially on a 3-D position and 3-D velocity vector. The operation of the host device is controlled based at least partially on the time-to-contact.

18 Claims, 2 Drawing Sheets

(56) References Cited

U.S. PATENT DOCUMENTS

| | | | |
|---|---|---|---|
| 2012/0027258 A1* | 2/2012 | Uchida | G06K 9/00805 |
| | | | 382/103 |
| 2012/0106786 A1* | 5/2012 | Shiraishi | G01S 17/936 |
| | | | 382/103 |
| 2012/0140076 A1* | 6/2012 | Rosenbaum | G06K 9/00805 |
| | | | 348/148 |
| 2014/0037138 A1* | 2/2014 | Sato | G08G 1/166 |
| | | | 382/103 |
| 2015/0066348 A1* | 3/2015 | Baba | G08G 1/166 |
| | | | 701/301 |
| 2015/0234045 A1* | 8/2015 | Rosenblum | G01S 13/931 |
| | | | 342/71 |
| 2016/0054452 A1* | 2/2016 | Cosatto | G01S 19/51 |
| | | | 701/412 |
| 2017/0123429 A1* | 5/2017 | Levinson | G05D 1/0088 |
| 2018/0024562 A1* | 1/2018 | Bellaiche | G01S 19/48 |
| | | | 701/26 |
| 2019/0034742 A1* | 1/2019 | Gokan | B60T 7/12 |

* cited by examiner

CONTROL OF HOST DEVICE USING THREE-DIMENSIONAL POSITION AND VELOCITY

INTRODUCTION

The present disclosure relates to a system and method of controlling operation of a host device in real-time, using three-dimensional position and velocity information of at least one neighboring object. Mobile devices, including but not limited to motor vehicles, may be surrounded by other moving and non-moving objects. If the surrounding objects are positioned at an incline relative to the host device, it may be challenging to ascertain their respective trajectories.

SUMMARY

A system and method of controlling operation of a host device in real-time includes an optical device operatively connected to the host device. The optical device is configured to obtain visual data, including one or more images of at least one object. The object is located at an incline, relative to the host device, the incline being characterized by an elevation angle ($\phi$) and an azimuth angle ($\theta$). A radar device is operatively connected to the host device and configured to obtain radar data. The radar data includes a radial distance (r) of the object from the host device, the azimuth angle ($\theta$), and a range rate (dr/dt).

A controller is operatively connected to the host device and includes a processor and tangible, non-transitory memory on which is recorded instructions. Execution of the instructions by the processor causes the controller to obtain respective bounding boxes around the object in the visual data. The controller is programmed to determine an optical flow of the respective bounding boxes, including determining a change rate of the elevation angle (d$\phi$/dt) and a change rate of the azimuth angle (d$\theta$/dt).

The controller is programmed to determine a time-to-contact for the host device and the object based at least partially on the 3-D position vector (X, Y, Z) and the 3-D velocity vector ($v_x$, $v_y$, $v_z$). The operation of the host device is controlled based at least partially on the time-to-contact.

The host device may include an automatic braking module configured to decelerate the host device. Controlling operation of the host device may include sending a signal to a user of the host device, if the time-to-contact is less than a first predefined threshold but greater than a second predefined threshold. Controlling operation of the host device may include activating the automatic braking module, if the time-to-contact is less than the second predefined threshold.

The controller may be programmed to communicate with a remote module such that the remote module is not physically connected to the controller. The controller may be programmed to transfer a location coordinate of the host device to the remote module and receive a location assessment factor (LAF) from the remote module, based at least partially on the location coordinate. In one embodiment, the controller is programmed to determine the time-to-contact only if the location assessment factor (LAF) is at or above a threshold value.

The system is configured to obtain three-dimensional position and velocity information for the object, by conjoining the radar data and the visual data. Because the position and velocity information is obtained in three dimensions, accuracy of the time-to-contact between the host device and the respective objects is significantly improved.

The controller may be programmed to match the respective bounding boxes in the visual data with the radar data. The controller may include an association module configured to perform the matching of the respective bounding boxes with the radar data. The controller is programmed to determine a 3-D position matrix (r, $\theta$, $\phi$) and a 3-D rate of change matrix (dr/dt, d$\theta$/dt, d$\phi$/dt), by combining the visual data and the radar data. The controller may include a Kalman filter module configured to perform the combining of the visual data and the radar data. A 3-D position vector (X, Y, Z) and a 3-D velocity vector ($v_x$, $v_y$, $v_z$) are obtained from the 3-D position matrix (r, $\theta$, $\phi$) and the 3-D rate of change matrix (dr/dt, d$\theta$/dt, d$\phi$/dt), respectively.

The respective bounding boxes include a first bounding box $B_1$ characterized by an initial position (u,v). The optical flow may be characterized by a first displacement change ($\Delta$u) of the respective bounding boxes in row coordinates and a second displacement change ($\Delta$v) of the respective bounding boxes in column coordinates, both over a predefined unit of time ($\Delta$t). The 3-D position matrix (r, $\theta$, $\phi$) and the 3-D change rate matrix (dr/dt, d$\theta$/dt, d$\phi$/dt) include respective components determined as a function of the optical flow, the initial position (u,v), an optical focal length (f) and the predefined unit of time ($\Delta$t).

The above features and advantages and other features and advantages of the present disclosure are readily apparent from the following detailed description of the best modes for carrying out the disclosure when taken in connection with the accompanying drawings.

DETAILED DESCRIPTION

Figure 1:
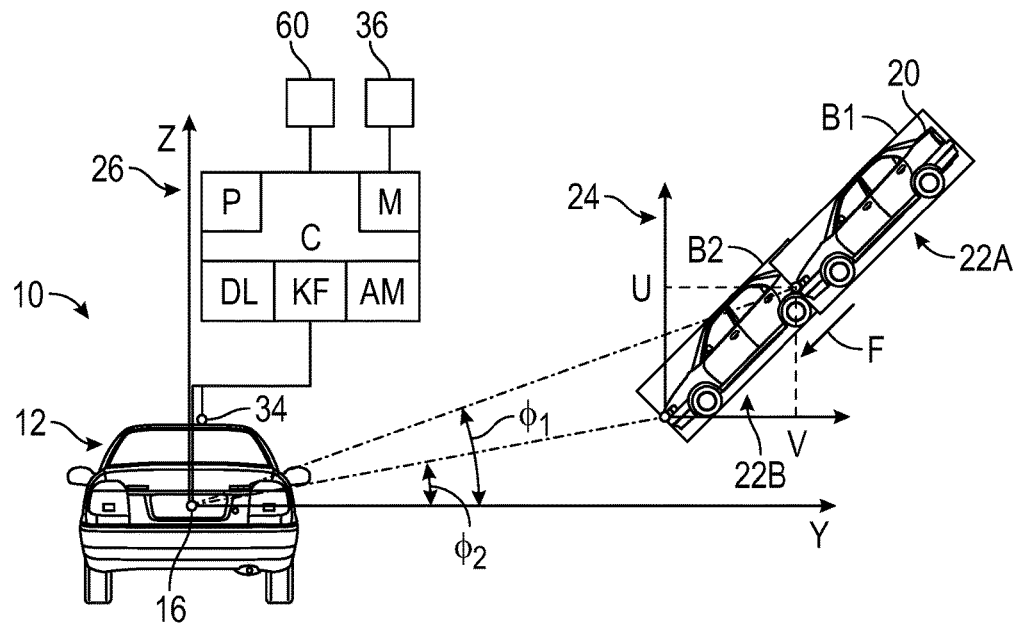
FIG. 1 is a schematic rear view of an example host device.
Figure 2:
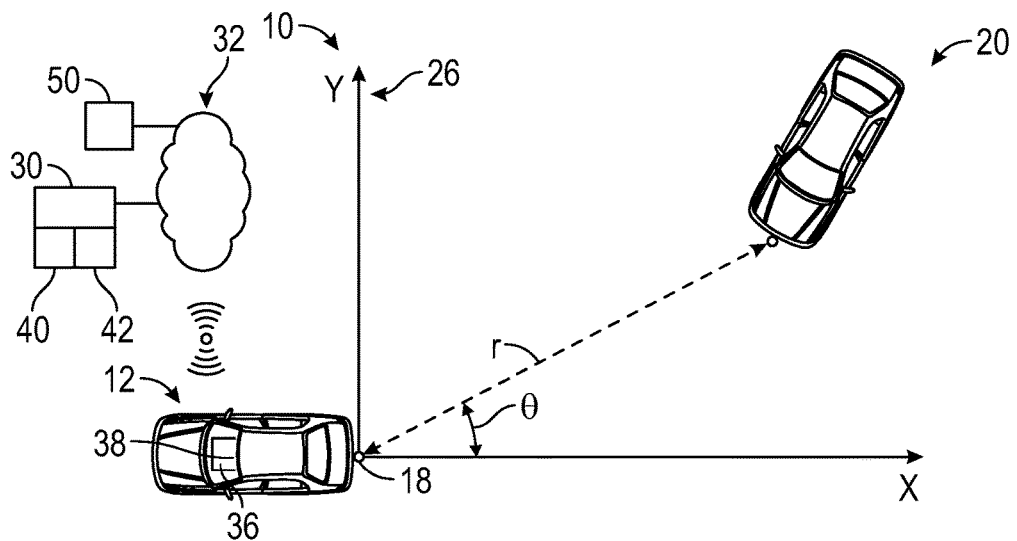
FIG. 2 is a schematic top view of the host device of FIG. 1.

Referring to the drawings, wherein like reference numbers refer to like components, FIGS. 1-2 schematically illustrate a system 10 of controlling operation of a host device 12 in real-time. FIG. 1 is a schematic rear view of an example host device 12. FIG. 2 is a schematic top view of the host device 12. The host device 12 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The host device 12 may take many different forms and include multiple and/or alternate components and facilities.

Referring to FIG. 1, an optical device 16 is operatively connected to the host device 12 and configured to obtain visual data of at least one object 20 surrounding the host device 12. Referring to FIG. 2, a radar device 18 is operatively connected to the host device 12 and configured to obtain radar data of the object 20. Referring to FIG. 2, the system 10 is configured to obtain three-dimensional (hereinafter "3-D") position and velocity information of the object 20, by conjoining the radar data and the visual data. It is to be appreciated that the optical device 16 and the radar device 18 may be mounted at any position relative to the host device 12. In one embodiment, the optical device 16 is positioned at a side of the host device 12. In one embodiment, the radar device 18 is mounted at the rear of the host device 12 and at its center of gravity.

Figure 3:
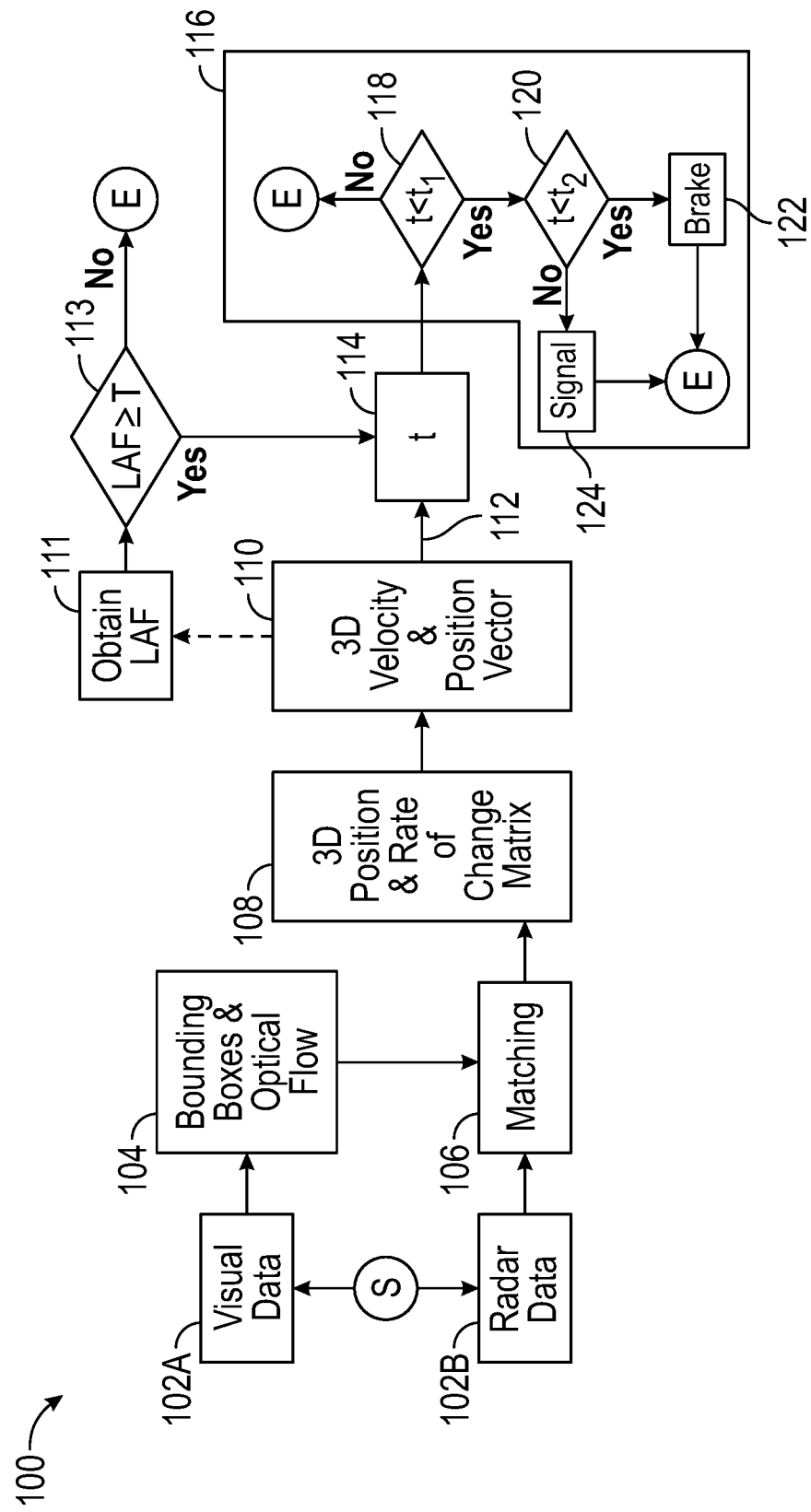
FIG. 3 is a schematic flow diagram for a method of controlling operation of the host device of FIG. 1.

Referring to FIG. 1, a controller C is operatively connected to the host device 12 and includes at least one processor P and at least one memory M (or non-transitory, tangible computer readable storage medium) on which are recorded instructions for executing method 100, shown in FIG. 3, for controlling operation of the host device 12. The memory M can store controller-executable instruction sets, and the processor P can execute the controller-executable instruction sets stored in the memory M.

Referring to FIGS. 1-2, the controller C may be configured to communicate with a remote module 30 that is not physically connected to the controller C, via a wireless network 32. In one embodiment, the host device 12 is configured to receive and transmit wireless communication to the remote module 30 through a navigation sensor 34, shown in FIG. 1. In another embodiment, the host device 12 is configured to receive and transmit wireless communication to the remote module 30 through a mobile application 36, shown in FIG. 2. The mobile application 36 may be built into and run on an infotainment system 38 of the host device 12. The circuitry and components of a remote server 30 and mobile application 36 ("apps") available to those skilled in the art may be employed. The mobile application 36 may be integral with or physically connected (e.g. wired) to the controller C, such that it has physical access to the data in the controller C.

Referring to FIG. 2, the remote module 30 may be operatively connected to a geographical database 50, via the wireless network 32. The geographical database 50 may be any public or commercial source of information available to those skilled in the art, such as for example, Google Earth. The remote module 30 may include at least one processor 40 and at least one memory 42 (or any non-transitory, tangible computer readable storage medium). The memory 42 can store controller-executable instruction sets, and the processor 40 can execute the controller-executable instruction sets stored in the memory 42. Referring to FIG. 1, the host device 12 may include an automatic braking module 60 configured to reduce motion or decelerate the host device 12.

Referring now to FIG. 3, a flowchart of the method 100 stored on and executable by the controller C of FIG. 1 is shown. Method 100 need not be applied in the specific order recited herein. Furthermore, it is to be understood that some steps may be eliminated. The start and end of the method 100 are indicated by "S" and "E," respectively.

In block 102A of FIG. 3, the controller C is programmed to obtain the visual data. Referring to FIG. 1, the visual data includes a sequence of images, for example, a first image 22A and second image 22B of the object 20, at time $t_A$ and $t_B$, respectively, in a first coordinate system 24. The object 20 is located at an incline relative to the host device 12. The incline is characterized by an elevation angle ($\phi$) (shown in FIG. 1) and an azimuth angle ($\theta$) (shown in FIG. 2).

In block 102B of FIG. 3, the controller C is programmed to obtain the radar data, in a second coordinate system 26 (axes labeled XYZ). The radar device 18 may include an embedded transmitter producing electromagnetic waves in the radio or microwave domain, a transmitting antenna, a receiving antenna, a receiver and an integrated processor. The electromagnetic waves reflect off the object 20 and return to the receiver, providing information about the location and speed of the object 20. The radar data includes a radial distance (r) of the object 20 from the host device 12, the azimuth angle ($\theta$), and a range rate (dr/dt).

In block 104, the controller C is programmed to obtain respective bounding boxes around the object 20 in each of the images in the visual data. Referring to FIG. 1, a first bounding box $B_1$ and a second bounding box $B_2$, are obtained for the first and second images 22A, 22B, respectively. Each bounding box may be defined as the minimum or smallest bounding or enclosing box for a set of points (defining the object 20) in three dimensions. In other words, the bounding box in each of the sequence of images is the box with the smallest volume within which all the points defining the object 20 lie. Referring to FIG. 1, the controller C may include a deep learning module (shown as "DL" in FIG. 1) to detect and localize each bounding box. The controller C may include a graphics processing unit employed by those skilled in the art to perform this task in real time.

In block 104 of FIG. 3, the controller C is also programmed to determine an optical flow (F) of the respective bounding boxes, such as first and second bounding boxes $B_1$, $B_2$. The optical flow (F) is characterized by a first displacement change ($\Delta u$) of the first and second bounding boxes $B_1$, $B_2$ in row coordinates or pixels and a second displacement change ($\Delta v$) of the first and second bounding boxes $B_1$, $B_2$ in column coordinates or pixels, both over the predefined time period ($\Delta t = t_B - t_A$). Referring to FIG. 1, the position of the first bounding box $B_1$ may be characterized by an initial position (u, v), i.e., the row and column coordinates at time twin the first coordinate system 24. The position of the second bounding box $B_2$ may be characterized by the second position (u+$\Delta u$, v+$\Delta v$), i.e., the row and column coordinates at time $t_B$ in the first coordinate system 24. It is to be appreciated that the reference positions may be selected at any part of the respective bounding box: front, rear, top or bottom.

Block 104 includes determining the change rate of the elevation angle ($d\phi/dt$) and the change rate of the azimuth angle ($d\theta/dt$). The elevation angle ($\phi$), azimuth angle ($\theta$), the change rate of the elevation angle ($d\phi/dt$) and the change rate of the azimuth angle ($d\theta/dt$) may be determined as a function of the optical flow, the initial position (u,v), an optical focal length (f) .e., the projection of the radial distance (r) on the X-Y plane in the first coordinate system 24 and the predefined unit of time ($\Delta t$) such that:

$(d\phi/dt) = \Delta u/(f*\Delta t)$;

$(d\theta/dt) = \Delta v/(f*\Delta t)$;

$\phi$ = inverse tangent($u/f$); and $\theta$ = inverse tangent($v/f$).

In block 106 of FIG. 3, the controller C is programmed to match the respective bounding boxes with the radar data. As noted above, the radar data includes a radial distance (r) of the object 20 from the host device 12, the azimuth angle ($\theta$), and a range rate (dr/dt). The controller C may include an association module (AM) (see FIG. 1) configured to match the respective bounding boxes in the visual data with the radar data.

In block 108 of FIG. 3, the controller C is programmed to determine a 3-D position matrix (r, $\theta$, $\phi$) and a 3-D rate of change matrix (dr/dt, d$\theta$/dt, d$\phi$/dt) by combining the visual data and the radar data. The controller C may include a Kalman filter module (KF) (see FIG. 1) to combine the visual data and the radar data. The Kalman filter module (KF) works in a recursive fashion and can run in real time, using the current state, the previously calculated state and its uncertainty matrix. The Kalman filter module (KF) may work in a two-step process. For example, in a first step, the Kalman filter module (KF) produces estimates of the current state variables, along with their uncertainties. Once the outcome of the next measurement (having a discrete amount of error such as random noise) is observed, these estimates are updated using a weighted average, with more weight being given to estimates with higher certainty.

In block 110 of FIG. 3, the controller C is programmed to determine a 3-D position vector (x, y, z) and a 3-D velocity vector ($v_x$, $v_y$, $v_z$) based at least partially on the 3-D position matrix (r, θ, φ) and the 3-D rate of change matrix (dr/dt, dθ/dt, dφ/dt). The respective components of the 3-D position vector (x, y, z) and the 3-D velocity vector ($v_x$, $v_y$, $v_z$) may be obtained as:

$$x = r \sin \phi \cos \theta; y = r \sin \theta \sin \phi; z = r \cos \phi;$$

$$v_x = [(dr/dt)\sin \phi \cos \theta + r(d\theta/dt)\cos \theta \cos \phi - r(d\phi/dt)\sin \theta \sin \phi];$$

$$v_y = [(dr/dt)\sin \theta \sin \phi + r(d\theta/dt)\cos \theta \sin \phi + r(d\phi/dt)\sin \theta \cos \phi];$$

$$v_z = [(dr/dt)\cos \phi - r(d\theta/dt)\sin \theta].$$

From block 110, the method 100 may proceed to block 111 (or block 114 directly, as shown by line 112). In block 111, the controller C is programmed to transmit a location coordinate (i.e., geophysical coordinates) of the host device 12 to the remote module 30 (see FIG. 1) and receive a location assessment factor (LAF) from the remote module 30. The remote module 30 is configured to determine the location assessment factor (LAF) based at least partially on the location coordinate and a look-up table or repository in the memory 42. The look-up table is configured to store location assessment factors (LAF) for various location coordinates. For example, if the location coordinate is an intersection or the location coordinate indicates a school in proximity, the location assessment factor (LAF) may be selected to be above the threshold value. If the location coordinate indicates an ordinary street, the location assessment factor (LAF) may be selected to be below the threshold value.

From block 111, the method 100 proceeds to block 113, where the controller C is programmed to determine if the location assessment factor (LAF) is at or above a threshold value (e.g. 0.5). In one embodiment, the controller C is programmed to proceed to block 114 and determine the time-to-contact as long as the location assessment factor (LAF) is at or above the threshold value.

As noted above, the method 100 may proceed to block 114 directly from block 110 or from block 113. In block 114 of FIG. 3, the controller C is programmed to determine a time-to-contact for the host device and the object based at least partially on the 3-D position vector (x, y, z) and the 3-D velocity vector ($v_x$, $v_y$, $v_z$). The time-to-contact (denoted by t) may be determined as:

$$t = \sqrt{(X/v_x)^2 + (Y/v_y)^2 + (Z/v_z)^2}$$

In block 116 of FIG. 3, the controller C is programmed to control operation of the host device 12 based on the time-to-contact. Block 116 includes sub-blocks 118, 120, 122 and 124. In block 118, the controller C is programmed to determine if the time-to-contact is less than a first predefined threshold ($t_1$). If so, the method 100 proceeds to block 120. If not, the method 100 is ended. In block 120, the controller C is programmed to determine if the time-to-contact is less than a second predefined threshold ($t_2$). The second predefined threshold is less than the first predefined threshold ($t_2 < t_1$). Per block 122, controlling operation of the host device 12 includes activating the automatic braking module 60, if the time-to-contact is less than the second predefined threshold ($t_2$). Per block 124, controlling operation of the host device 12 includes sending a signal to a user of the host device 12, if the time-to-contact is less than the first predefined threshold ($t_1$) but greater than the second predefined threshold ($t_2$).

The controller C (and execution of the method 100) improves the functioning of the host device 12 by precisely obtaining time-to-contact between the host device 12 and the respective ones of the plurality of objects 20 and controlling operation of the host device 12 based at least partially on the time-to-contact. The controller C of FIG. 1 may be an integral portion of, or a separate module operatively connected to, other controllers of the host device 12.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of controlling operation of a host device in real-time, the system comprising:
an optical device operatively connected to the host device and configured to obtain visual data of at least one object, the at least one object being located at an incline relative to the host device, the incline being characterized by an elevation angle ($\phi$) and an azimuth angle ($\theta$);
a radar device operatively connected to the host device and configured to obtain radar data, including the azimuth angle ($\theta$), a radial distance (r) of the at least one object from the host device and a change rate of the range (dr/dt);
a controller operatively connected to the host device and including a processor and tangible, non-transitory memory on which is recorded instructions, execution of the instructions by the processor causing the controller to:
obtain respective bounding boxes around the at least one object in the visual data, the respective bounding boxes including a first bounding box characterized by an initial position (u,v);
match the respective bounding boxes with the radar data;
determine an optical flow of the respective bounding boxes, including determining a change rate of the elevation angle (d$\phi$/dt) and a change rate of the azimuth angle (d$\theta$/dt), the optical flow being characterized by a first displacement change ($\Delta$u) of the first bounding box in row coordinates and a second displacement change ($\Delta$v) of the first bounding box in column coordinates, both over a predefined unit of time ($\Delta$t);
determine a 3-D position matrix (r, $\theta$, $\phi$) and a 3-D rate of change matrix (dr/dt, d$\theta$/dt, d$\phi$/dt) based on the visual data and the radar data, including determining respective components of the 3-D position matrix (r, $\theta$, $\phi$) and the 3-D change rate matrix (dr/dt, d$\theta$/dt, d$\phi$/dt) as a function of the optical flow, the initial position (u,v), an optical focal length (f) and the predefined unit of time ($\Delta$t) such that: $\phi$=inverse tangent (u/f), $\theta$=inverse tangent (v/f), (d$\theta$/dt)=$\Delta$v/(f*$\Delta$t) and (d$\phi$/dt) =$\Delta$u/(f*$\Delta$t); and
control operation of the host device based at least partially on the 3-D position matrix (r, $\theta$, $\phi$) and the 3-D rate of change matrix (dr/dt, d$\theta$/dt, d$\phi$/dt).

2. The system of claim 1, wherein the controller is configured to:
obtain a 3-D position vector (X, Y, Z) and a 3-D velocity vector ($v_x$, $v_y$, $v_z$) from the 3-D position matrix (r, $\theta$, $\phi$) and the 3-D change rate matrix (dr/dt, d$\theta$/dt, d$\phi$/dt); and
determine a time-to-contact for the host device and the at least one object based at least partially on the 3-D position vector (X, Y, Z) and the 3-D velocity vector ($v_x$, $v_y$, $v_z$).

3. The system of claim 2, wherein the controller is configured to:
communicate with a remote module such that the remote module is not physically connected to the controller;
transfer a location coordinate of the host device to the remote module;
receive a location assessment factor (LAF) from the remote module, based at least partially on the location coordinate; and
determine the time-to-contact only if the location assessment factor (LAF) is at or above a threshold value.

4. The system of claim 2, wherein the controlling operation of the host device includes:
sending a signal to a user of the host device, if the time-to-contact is less than a first predefined threshold but greater than a second predefined threshold; and
wherein the first predefined threshold is greater than the second predefined threshold.

5. The system of claim 4, wherein:
the host device includes an automatic braking module configured to decelerate the host device; and
controlling operation of the host device includes activating the automatic braking module, if the time-to-contact is less than the second predefined threshold.

6. The system of claim 2, wherein:
the controller includes an association module configured to perform the matching of the respective bounding boxes with the radar data.

7. The system of claim 2, wherein:
the controller includes a Kalman filter module configured to perform the combining of the visual data and the radar data.

8. The system of claim 2, wherein the time-to-contact (t) is defined as:

$$t=\sqrt{(X/v_x)^2+(Y/v_y)^2+(Z/v_z)^2}.$$

9. The system of claim 2, wherein respective components of the 3-D position vector (X, Y, Z) and the 3-D velocity vector ($v_x$, $v_y$, $v_z$) are defined as:

X=r sin $\phi$ cos $\theta$;

Y=r sin $\theta$ sin $\phi$;

Z=r cos $\phi$;

$v_x$=[(dr/dt)sin $\phi$ cos $\theta$+r(d$\theta$/dt)cos $\theta$ cos $\phi$−r(d$\phi$/dt) sin $\theta$ sin $\phi$];

$v_y$=[(dr/dt)sin $\theta$ sin $\phi$+r(d$\theta$/dt)cos $\theta$ sin $\phi$+r(d$\phi$/dt)sin $\theta$ cos $\phi$]; and $v_z$=[(dr/dt)cos $\phi$−r(d$\theta$/dt)sin $\theta$].

10. A method of controlling operation of a host device in real-time, the host device operatively connected to an optical device, a radar device and a controller having a processor and tangible, non-transitory memory, the method comprising:
obtaining visual data of at least one object via the optical device, the at least one object being located at an incline relative to the host device, the incline being characterized by an elevation angle ($\phi$) and an azimuth angle ($\theta$);
obtaining radar data via the radar device, including the azimuth angle ($\theta$), a radial distance (r) of the at least one object from the host device and a change rate of the range (dr/dt);
obtaining respective bounding boxes around the at least one object in the visual data, the respective bounding boxes including a first bounding box characterized by an initial position (u,v), via the controller;
matching the respective bounding boxes with the radar data, via the controller;

determining an optical flow of the respective bounding boxes, via the controller, including determining a change rate of the elevation angle (dφ/dt) and a change rate of the azimuth angle (dθ/dt), via the controller, the optical flow being characterized by a first displacement change (Δu) of the first bounding box in row coordinates and a second displacement change (Δv) of the first bounding box in column coordinates, both over a predefined unit of time (Δt);

determining a 3-D position matrix (r, θ, φ) and a 3-D rate of change matrix (dr/dt, dθ/dt, dφ/dt) based on the visual data and the radar data, via the controller, including determining respective components of the 3-D position matrix (r, θ, φ) and the 3-D change rate matrix (dr/dt, dθ/dt, dφ/dt) as a function of the optical flow, the initial position (u,v), an optical focal length (f) and the predefined unit of time (Δt) such that: φ=inverse tangent (u/f), θ=inverse tangent (v/f), (dθ/dt) =Δv/(f*Δt) and (dφ/dt)=Δu/(f*Δt); and controlling operation of the host device based at least partially on the 3-D position matrix (r, θ, φ) and the 3-D rate of change matrix (dr/dt, dθ/dt, dφ/dt).

11. The method of claim 10, wherein the controller is configured to:

obtain a 3-D position vector (X, Y, Z) and a 3-D velocity vector ($v_x$, $v_y$, $v_z$) from the 3-D position matrix (r, θ, φ) and the 3-D change rate matrix (dr/dt, dθ/dt, dφ/dt); and determine a time-to-contact for the host device and the at least one object based at least partially on the 3-D position vector (X, Y, Z) and the 3-D velocity vector ($v_x$, $v_y$, $v_z$).

12. The method of claim 11, wherein the controller is configured to:

communicate with a remote module such that the remote module is not physically connected to the controller;

transfer a location coordinate of the host device to the remote module;

receive a location assessment factor (LAF) from the remote module, based at least partially on the location coordinate; and determine the time-to-contact only if the location assessment factor (LAF) is at or above a threshold value.

13. The method of claim 11, wherein the controlling operation of the host device includes:

sending a signal to a user of the host device, if the time-to-contact is less than a first predefined threshold but greater than a second predefined threshold; and wherein the first predefined threshold is greater than the second predefined threshold.

14. The method of claim 13, wherein:

the host device includes an automatic braking module configured to decelerate the host device; and controlling operation of the host device includes activating the automatic braking module, if the time-to-contact is less than the second predefined threshold.

15. The method of claim 11, further comprising:

the controller includes an association module configured to perform the matching of the respective bounding boxes with the radar data.

16. The method of claim 11, wherein:

the controller includes a Kalman filter module configured to perform the combining of the visual data and the radar data.

17. The method of claim 11, wherein the time-to-contact (t) is defined as:

$$t=\sqrt{(X/v_x)^2+(Y/v_y)^2+(Z/v_z)^2}.$$

18. The method of claim 10, further comprising:

defining the respective components of the 3-D position vector (X, Y, Z) and the 3-D velocity vector ($v_x$, $v_y$, $v_z$) as:

X=r sin φ cos θ;

Y=r sin θ sin φ;

Z=r cos φ;

$v_x$=[(dr/dt)sin φ cos θ+r(dθ/dt)cos θ cos φ−r(dφ/dt) sin θ sin φ];

$v_y$=[(dr/dt)sin θ sin φ+r(dθ/dt)cos θ sin φ+r(dφ/dt)sin θ cos φ]; and $v_z$=[(dr/dt)cos φ−r(dθ/dt)sin θ].

* * * * *